United States Patent
Li

(10) Patent No.: US 6,642,774 B1
(45) Date of Patent: Nov. 4, 2003

(54) HIGH PRECISION CHARGE PUMP REGULATION

(75) Inventor: Bo Li, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/187,219

(22) Filed: Jun. 28, 2002

(51) Int. Cl.[7] .................................................. G05F 1/10
(52) U.S. Cl. ........................................................ 327/536
(58) Field of Search ................................. 327/530, 534, 327/535, 536, 537

(56) References Cited

U.S. PATENT DOCUMENTS

| | | | |
|---|---|---|---|
| 5,059,815 A | 10/1991 | Bill et al. | |
| 5,339,272 A | 8/1994 | Tedrow et al. | |
| 5,414,669 A | 5/1995 | Tedrow et al. | |
| 5,426,334 A | * 6/1995 | Skovmand | 327/427 |
| 5,553,295 A | 9/1996 | Pantelakis et al. | |
| 5,757,170 A | 5/1998 | Pinney | |
| 5,812,017 A | 9/1998 | Golla et al. | |
| 5,835,420 A | 11/1998 | Lee et al. | |
| 5,986,947 A | 11/1999 | Choi et al. | |
| 6,255,896 B1 | 7/2001 | Li et al. | |
| 6,278,317 B1 | * 8/2001 | Hsu et al. | 327/536 |
| 6,292,048 B1 | 9/2001 | Li | |
| 6,297,687 B1 | 10/2001 | Sugimura | |
| 6,518,830 B2 | * 2/2003 | Gariboldi et al. | 327/536 |

* cited by examiner

Primary Examiner—Jeffrey Zweizig
(74) Attorney, Agent, or Firm—Peter Lam

(57) ABSTRACT

A method for high precision charge pump regulation. The method of one embodiment comprises comparing an output feedback voltage with a reference voltage to determine whether the output feedback voltage is greater than or less than the reference voltage. In response to the comparison, either increasing a frequency for a clock signal if the output feedback voltage is less than the reference voltage, decreasing the frequency for the clock signal if the output feedback voltage is greater than the reference voltage; or disabling the clock signal if the output feedback voltage is much greater than the reference voltage. A pumped voltage is generated in response to changes to the clock signal.

29 Claims, 8 Drawing Sheets

US 6,642,774 B1

HIGH PRECISION CHARGE PUMP REGULATION

FIELD OF THE INVENTION

The present invention relates generally to the field of computers and computer systems. More particularly, the present invention relates to a method and apparatus for high precision charge pump regulation.

BACKGROUND OF THE INVENTION

Many of today's computing applications such as cellular phones, digital cameras, and personal computers, use non-volatile memories to store data or code. Nonvolatility is advantageous because it allows the computing system to retain its data and code even when power is removed from the computing system. Thus if the system is turned off or if there is a power failure, there is no loss of code or data.

One example of a nonvolatile memory device is the flash Electrically Erasable Programmable Read-only Memory (flash EEPROM or flash memory). Flash memory can be programmed by the user, and once programmed, the flash memory retains its data until the memory is erased. Electrical erasure of the flash memory erases the contents of the memory of the device in one relatively rapid operation. The flash memory may then be programmed with new code or data.

Flash memories have been used in portable computers and similar circuitry as both read only memory and as long term storage which may be both read and written. However, the tendency has been to reduce the power requirements of such portable computers to make systems lighter and to increase the length of use between recharging. This has required that the voltage potentials available to program the flash memory arrays be reduced. Flash memories must be able to operate in systems where a VCC supply voltage of 5V, 3V, or an even smaller voltage is available to circuit components.

However, performing program and erase operations in flash memory components requires that greater voltage than that supplied to the component be applied to the flash memory cells. For example, a program operation may require that approximately 10.5V be applied to a memory cell. In order to achieve this voltage, a charge pump circuit is required in the flash memory component. A positive charge pump can take a supplied VCC voltage and create a voltage sufficient for program operations. The charge pump must also be able to deliver sufficient current at the required voltage levels.

Furthermore, as the electronic applications and devices that use integrated circuit components move to lower and lower power, the flash memory components in these applications also have to be more power efficient. One possible area for optimization is the charge pump circuitry.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
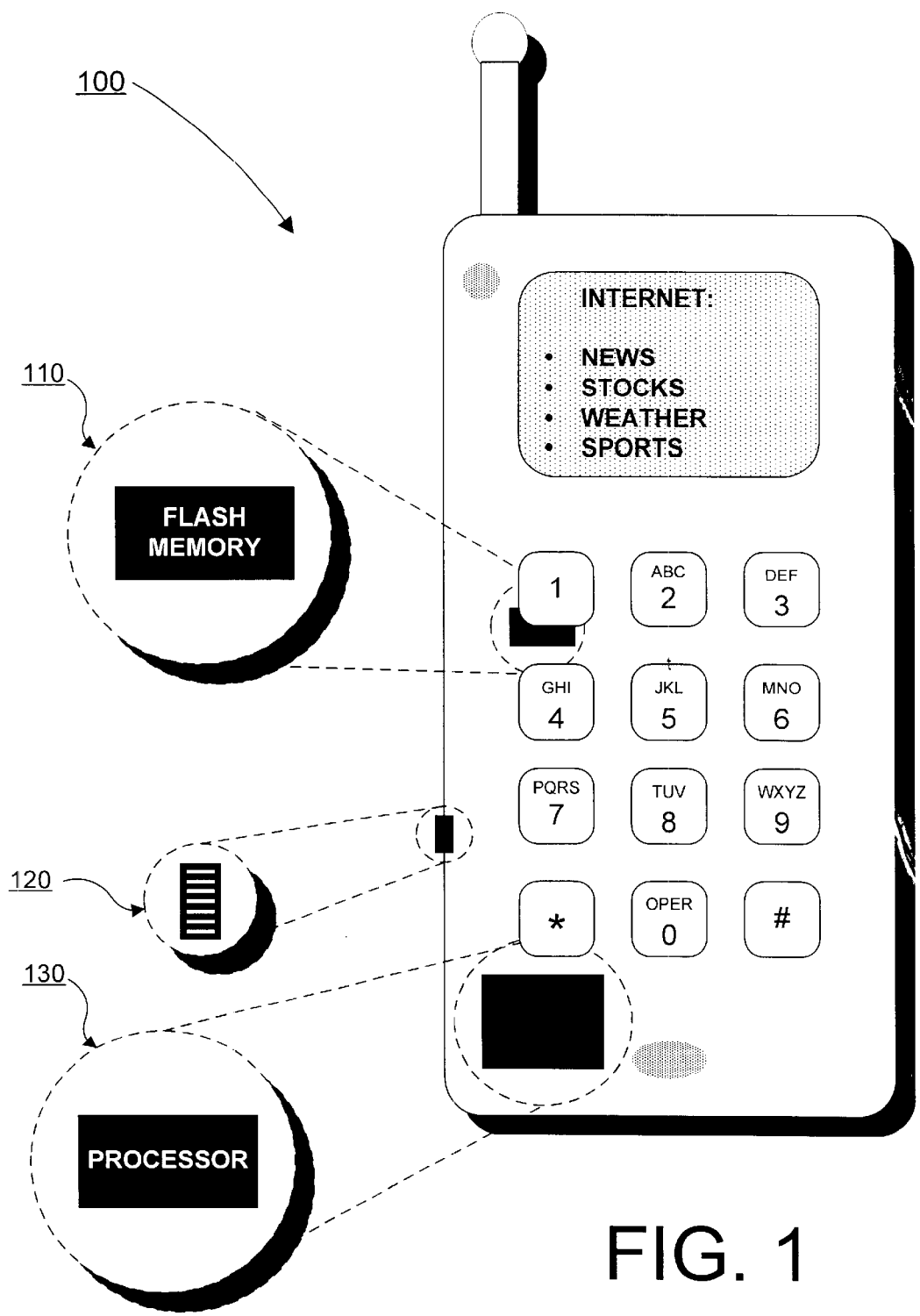
FIG. 1 illustrates one embodiment of a cellular telephone using a flash memory device.

A method and apparatus for a high precision charge pump regulation is disclosed. The embodiments described herein are described in the context of a memory, but are not so limited. Although the following embodiments are described with reference to a flash memory, other embodiments are applicable to other types of integrated circuits or logic devices. The same techniques and teachings of the present invention can easily be applied to other types of circuits or semiconductor devices that use charge pumps.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

A flash EEPROM memory device (cell) is a floating gate MOS field effect transistor having a drain region, a source region, a floating gate, and a control gate. Conductors are connected to each drain, source, and control gate for applying signals to the transistor. A flash EEPROM cell is capable of functioning in the manner of a normal EPROM cell and will retain a programmed value when power is removed from the circuitry. A flash EEPROM cell may typically be used to store a one or zero condition. If multilevel cell (MLC) technology is used, multiple bits of data may be stored in each flash EEPROM cell. Unlike a typical EPROM cell, a flash EEPROM cell is electrically erasable in place and does not need to be removed and diffused with ultra-violet to accomplish erasure of the memory cells.

As supply voltages and device sizes continue to decrease, the sensitivity of flash cell devices to variations in temperature, manufacturing processes, and supply voltages does not. Furthermore, as more flash memory devices make use of MLC technology, the circuitry requires more stringent supply voltages and sensing capabilities. This is because MLC flash cells are more susceptible to data errors due to tighter threshold voltage (Vt) ranges in the storage of data bits. For example, a single bit flash cell can use an entire voltage range such as from 2.0 volts up to 4.0 volts to store the value of a single bit a data. For simplicity, the cutoff threshold for determining whether the flash cell is storing a '1' or a '0' bit is 3.0 volts. Thus if the Vt value of a flash cell is greater than 3.0 volts, a '1' is stored therein and if the Vt value is less than 3.0 volts, a '0' is stored therein. But with a MLC flash cell, two bits of data are store within the same voltage range of 2.0 volts to 4.0 volts. So the two bits in the single MLC flash cell are storing "1, 1" if the Vt value is greater than 3.5 volts, "1, 0" if the Vt value is between 3.0 volts and 3.5 volts, "0, 1" if the Vt value is between 2.5 volts and 3.0 volts, and "0, 0" if the Vt value is less than 2.5 volts. The voltage values of this example have been randomly picked for ease in discussion, but actually voltage values can be much more precise and the range much smaller.

Existing power circuits do not provide accurate enough voltage levels and can easily vary ±450 millivolts (mV) from the target value. Whereas a pump voltage variation of between ±350 mV to 550 mV may be tolerable in a single bit flash environment, a MLC flash environment may require variations to be less than ±50 mV. A single bit flash cell may still correctly sample, read, verify, and operate with large voltage variations where a MLC flash cell may not. Circuits pertaining to read operations are extremely sensitive. Read windows and regulation can be the most sensitive circuits of MLC parts because of the voltage tolerances. Thus tighter control of the voltages for programming, erasing, sensing, etc. is necessary in order to store and read the correct data values.

MLC flash memory generally needs high precision word-line voltages. The segmentation of the threshold voltage ranges for data storage in a MLC flash cell makes the devices more sensitive to voltage levels. Precise voltage levels are needed in order to achieve tight, precise Vt distributions on the flash cells. General charge pump regulation, as well as a second layer of voltage regulation, is also needed to achieve a lower supply voltage variation from the pump supply. However, the present read regulation schemes are extremely costly both in terms of power and die size area. Furthermore, read regulators increase the complexity of the architecture and design of the chip.

Embodiments of the present invention can provide more accurate supply voltages from charge pumps. For instance, one embodiment of the present invention uses a new single pump regulation circuit to achieve high precision voltage control of approximately ±50 mV within the target value across a variety of VCC supply voltages, temperatures, and manufacturing process corners.

Referring now to FIG. 1, there is an example of a cellular telephone 100 using a flash memory device 110. The cellular telephone 100 shown in FIG. 1 is a digital phone capable of internet access. For example, a user can download and receive information from the Internet via cellular access. This cellular phone 100 can be a Personal Communications Service (PCS) phone using digital cellular technology such as Code-Division Multiple Access (CDMA), Time Division Multiple Access (TMDA), or Global System for Mobile (GSM) Communications. Similarly, flash memory can also be used in analog type cellular phones. Thus, the present invention is not limited to any specific combination of hardware circuitry and software.

Flash memory 110 and a processor 130 are located within cellular phone 100. Flash memory 110 has been designed to include a fast program mode. Processor 130 can be an embedded processor or a digital signal processing (DSP) chip. The phone 100 of FIG. 1 also includes a access port 120. Access port 120 can be used to physically link the phone 100 to an external system for code and/or data update. For instance, the flash memory can be updated through the access port interface or through a download via cellular transmission.

A memory update via the access port 120 is an example of an in-system write. In-system write utilizes the system processor 130 to execute flash memory erase and program algorithms. An engineer creates erase, program and verify algorithms and then downloads these algorithms into the system random access memory (RAM). The processor 130 executes the algorithms and ports code to the flash memory 110 for updates. In-system write is also a way to perform PC BIOS code updates.

The present invention is not limited to cellular phones. Alternative embodiments of the present invention can be used in other types of devices such as handheld devices and embedded applications. Some examples of handheld devices include Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses flash memory for other embodiments. Flash memory is also used in personal computers (PC) and other computer systems.

For another embodiment of a system, a charge pump can be used with a system on a chip. One embodiment of a system on a chip comprises of a processor and a memory. The memory for one system is a flash memory. The flash memory can be located on the same die as the processor and other system components. Additionally, other logic blocks such as a memory controller or graphics controller can also be located on a system on a chip. By including one embodiment of the present invention on the system on a chip, the flash memory can be updated quickly and with minimal inconvenience to a user.

Figure 2:
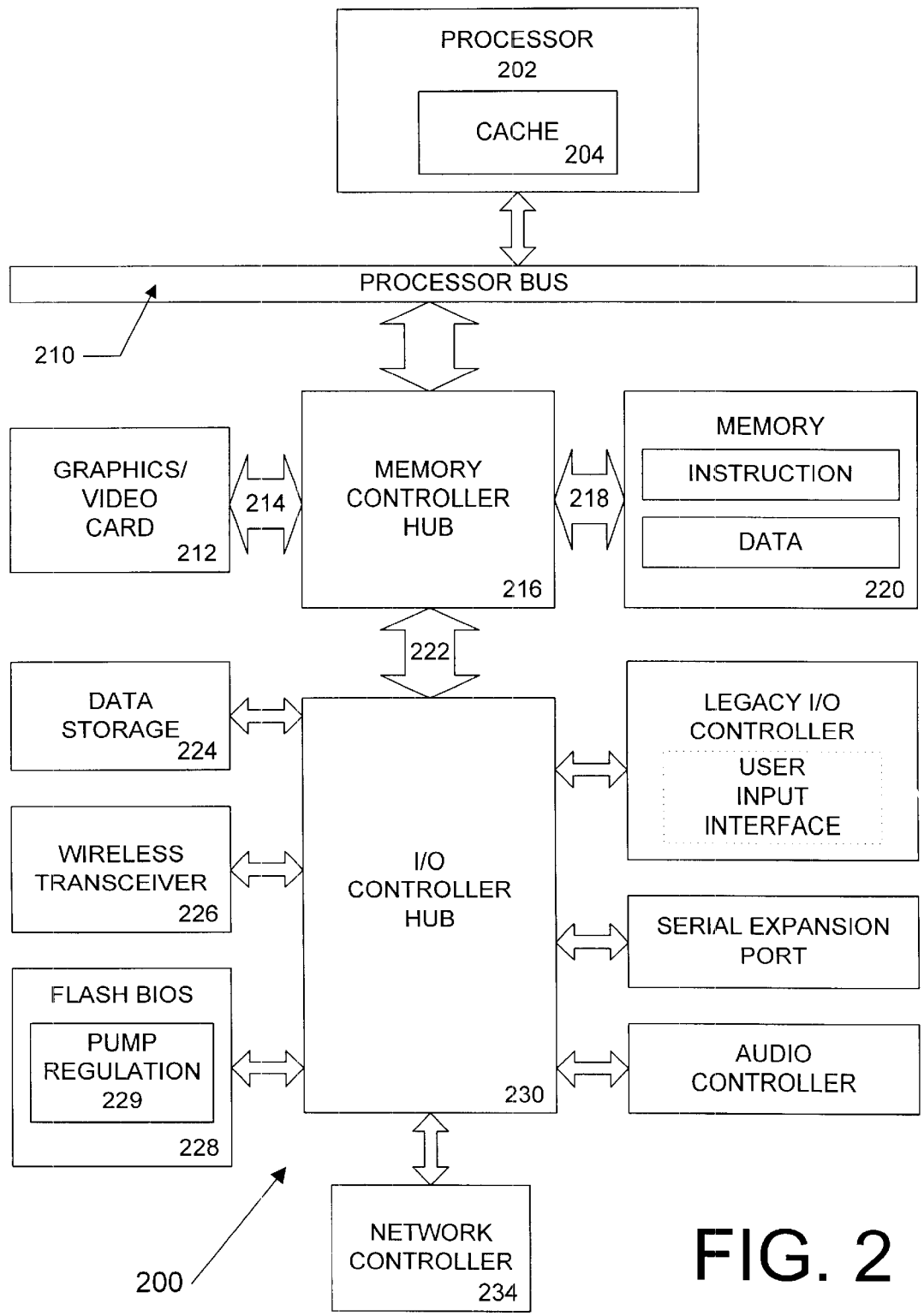
FIG. 2 is a block diagram of one embodiment of a computer system including a component utilizing a high precision charge pump regulation in accordance with the present invention.

Referring now to FIG. 2, an exemplary computer system 200 is shown. System 200 includes a component, such as a flash memory, to employ a high precision charge pump regulation in accordance with the present invention, such as in the embodiment described herein. System 200 is representative of processing systems based on the PENTIUM® III, PENTIUM® 4, Itanium™, and/or StrongARM™ microprocessors available from Intel Corporation of Santa Clara, Calif., although other systems (including PCs having other microprocessors, engineering workstations, set-top boxes and the like) may also be used. In one embodiment, sample system 200 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include network computers (NetPC), set-top boxes, network hubs, wide area network (WAN) switches, or any other system that utilizes wireless communications.

FIG. 2 is a block diagram of one embodiment of a computer system 200 including a component utilizing a high precision charge pump regulation in accordance with the present invention. The processor 202 includes an internal cache memory 204. The present embodiment is described in the context of a single processor desktop or server system, but alternative embodiments can be included in a multiprocessor system. System 200 is an example of a hub architecture. The computer system 200 includes a processor 202 to process data signals. The processor 202 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 202 is coupled to a processor bus 210 that transmits data signals between the processor 202 and other components in the system 200. The elements of system 200 perform their conventional functions that are well known to those familiar with the art.

System 200 includes a memory 220. Memory 220 can be a dynamic random access memory (DRAM) device, a static random access memory (SRAM) device, flash memory device, or other memory device. Memory 220 can store instructions and/or data represented by data signals that can be executed by the processors 202. An internal cache memory 204 can reside inside the processor 202 to store recently used data signals from memory 220. Alternatively, in another embodiment, the cache memory can reside external to the processor 202.

A system logic chip 216 is coupled to the processor bus 210 and memory 220. The system logic chip 216 in the illustrated embodiment is a memory controller hub (MCH). The processor 202 communicates to the MCH 216 via a processor bus 210. The MCH 216 provides a high bandwidth memory path 218 to memory 220 for instruction and data storage and for storage of graphics commands, data and textures. The MCH 216 is to direct data signals between the processor 202, memory 220, and other components in the system 200 and to bridge the data signals between processor bus 210, memory 220, and system I/O 222. In some embodiments, the system logic chip 216 can provide a graphics port for coupling to a graphics controller 212. The MCH 216 is coupled to memory 220 through a memory interface 218. The graphics card 212 is coupled to the MCH 216 through an Accelerated Graphics Port (AGP) interconnect 214.

System 200 uses a proprietary hub interface bus 222 to couple the MCH 216 to the I/O controller hub (ICH) 230. The ICH 230 provides direct connections to some I/O devices via a local I/O bus. The local I/O bus is a high-speed I/O bus for connecting peripherals to the memory 220, chipset, and processor 202. Some examples are the audio controller, firmware hub (flash BIOS) 228, data storage 224, legacy I/O controller containing user input and keyboard interfaces, a serial expansion port such as Universal Serial Bus (USB), and a network controller 234. The data storage device 224 can comprise a hard disk drive, a floppy disk drive, a CD-ROM device, a flash memory device, and/or other mass storage device.

For the embodiment of a computing system 200 in FIG. 2, a wireless transceiver 226 is also coupled to the ICH 230. The wireless transceiver is capable of receiving and transmitting data from the system 200 through the ICH 230 as well as using wireless signals to receive and transmit data from remote systems. Control of the transceiver 226 resides with device driver software and memory 220, which communicates with firmware software and memory residing on the wireless transceiver 226. The processor 202 can execute instructions from memory 220 that cause the processor to send data to and request from the wireless transceiver. Application software and the operating system, working through the wireless transceiver device driver, can interface the wireless transceiver 226. The wireless transceiver enables the system 200 to communicate with other computers and devices that have wireless capability.

Figure 3:
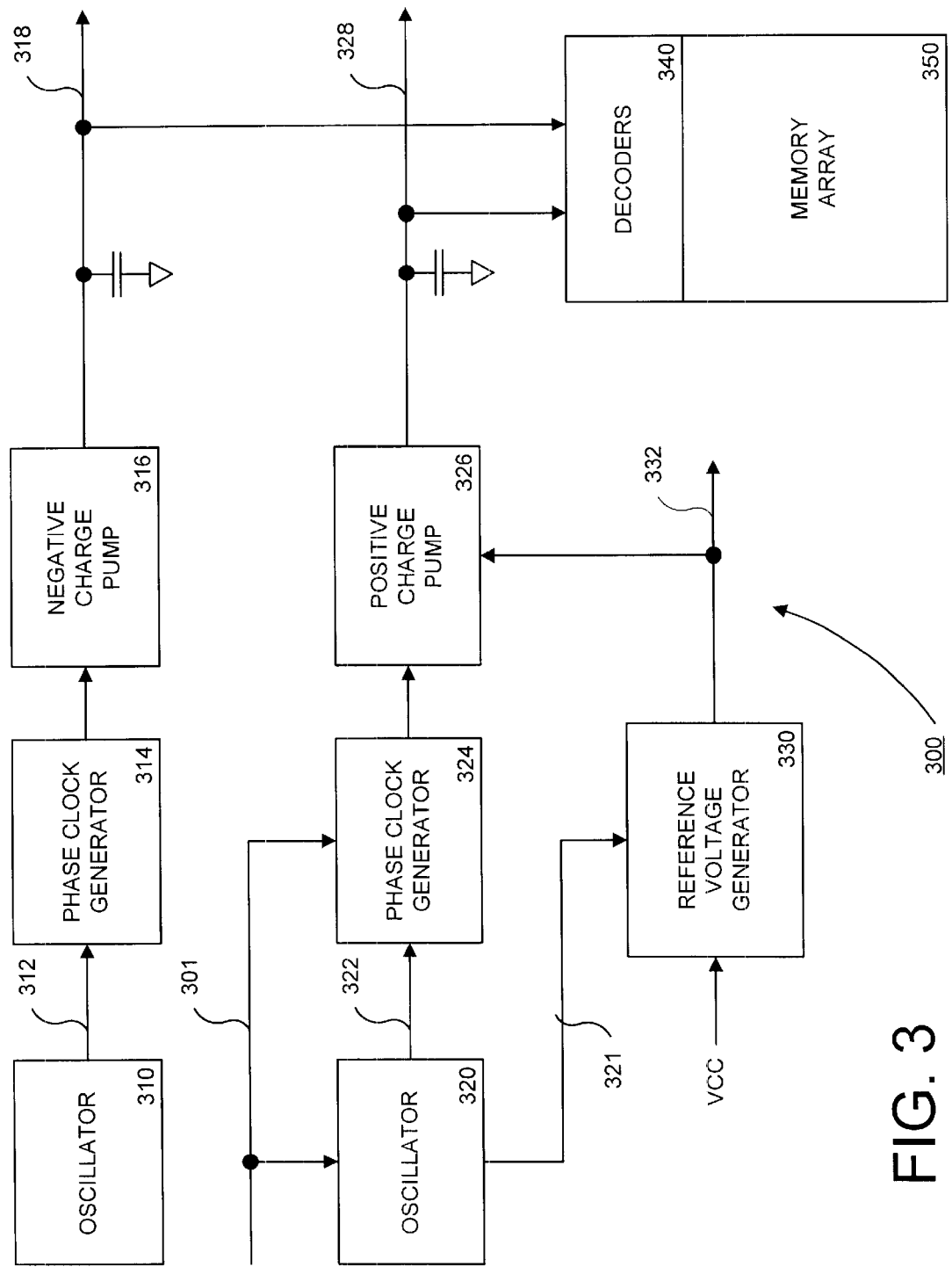
FIG. 3 is a block diagram of a flash memory circuit using a high precision charge pump regulation mechanism of one embodiment.

FIG. 3 is a block diagram of a flash memory circuit 300 using a high precision charge pump regulation mechanism of one embodiment. Reference generator 330 provides a reference voltage 332 to the positive pump 326. For one embodiment, the positive charge pump 326 and negative charge pump 316 include a self initialization mechanism. The positive pump 326 provides a regulated voltage of approximately five volts over decoder supply line 328 to the decoders 340 of the memory array 350. The negative pump 316 provides a voltage of approximately negative five volts over decoder supply line 318 to the decoders 340 of memory array 350. A first oscillator 310 provides a clock signal 312 to a first phase clock generator (or clock driver) 314 that periodically pulses or enables the negative pump 316 during standby mode. A second oscillator 320 provides clock signals 321, 322 to the reference generator 330 and a second phase clock generator 324. The clock signals 322, 321, periodically pulse or enable the positive pump 326 and the reference generator 330, respectively, when they are in a standby mode. The clock signals 312, 321, 322 may each have a different frequency. The phase clock generators 314, 324, drive the pumping action in the negative charge pump 316 and the positive charge pump 326, respectively. Although the pump outputs 318, 328, of this example are shown as primarily driving the decoders 340 and the memory array 350, the pump outputs also supplies other circuitry on the integrated circuit that need supply voltages other than VCC and ground.

In this flash circuit 300, the pump regulation mechanism includes a control signal 301 that can enable or disable the second oscillator 320 and the second phase clock generator 324 based on input from the positive pump output feedback loop. Before the output node of the positive charge pump 326 is a large filtering diode device that is part of the pump regulation. This large diode couples the pumped supply voltage from the positive charge pump 326 to the memory array 350 via decoders 340. The diode is also coupled to a feedback loop via a resistor divider. This feedback loop operates to help regulated the charge pump operation. Unlike regulation schemes that use read regulator circuits, embodiments of the present invention do not wastefully pump the output voltage level up to unnecessary levels in order to drop the voltage level back down to a desired value with regulation. Pumping a voltage to a voltage level that is not actually needed by circuits at the pump output can increase power consumption and cause heat dissipation issues. Schemes with read regulators can also consume large amounts of die size as the charge pump has to be large to supply enough current. The embodiments of the pump regulation of the present invention take a limited amount of die area as the additional circuitry is minimal.

Figure 4:
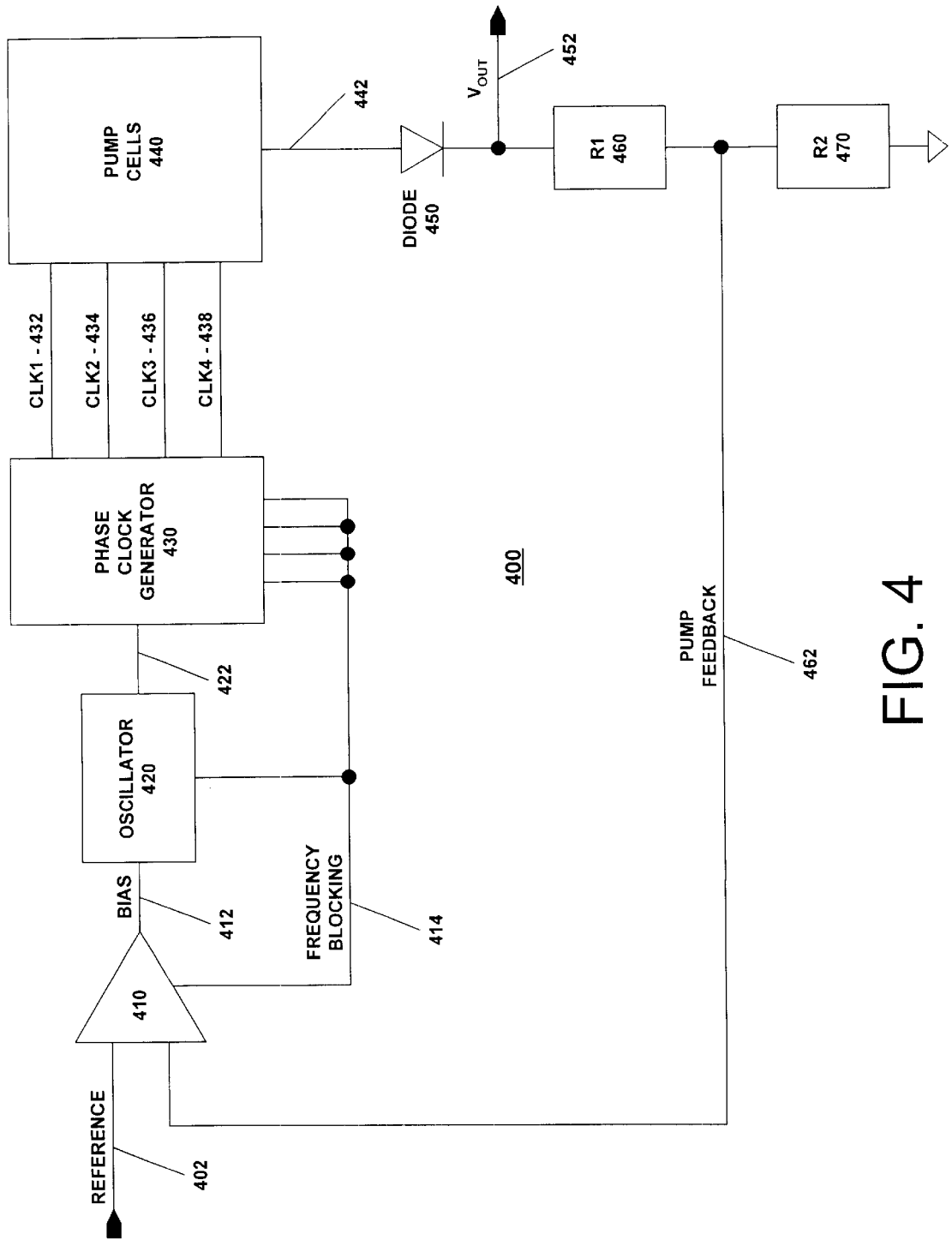
FIG. 4 is a block diagram of one embodiment of a charge pump including a high precision charge pump regulation mechanism in accordance with the present invention.

FIG. 4 is a block diagram of a one embodiment of a high precision charge pump 400 including a pump regulation mechanism in accordance with the present invention. This example embodiment describes a pump based regulation design that includes features such as four phase frequency blocking, low pass diode filtering, and a dual port high gain differential amplifier. The pump 400 of this embodiment can provide an output voltage level that is independent of external current loading. A comparator 410 receives a reference voltage 402 and a pump feedback voltage 462. The comparator 410 of this embodiment is a dual port high gain differential amplifier that can provide a digital output and an analog output. The reference voltage 402 indicates a voltage at which the charge pump cells 440 should be presently outputting. The comparator 410 takes the reference voltage 402 and examines whether the voltage from the pump feedback loop to determine whether the charge pump 400 is operating as desired.

The comparator 410 provides two output signals: a bias signal 412 and a frequency block signal 414. The bias signal 412 is an analog type signal from the differential amplifier 410 and its voltage level can vary from a ground potential to VCC or some designated voltage range. The bias signal 412 is coupled to an oscillator 420 and serves to control the clocking speed or oscillator frequency of the oscillator 420. For instance, the bias signal 412 can either increase or decrease the frequency of the oscillator 420 based on the voltage level of the bias signal 412. The comparator 410 uses the bias signal 412 to control the frequency in an analog fashion. Thus the oscillator 420 is gradually slowed down or sped up over time, rather than being switched on or off instantaneously.

The frequency blocking signal 414 is a digital output from the differential amplifier 410 and its value varies between a logic high and a logic low. The frequency blocking signal 414 also outputted from comparator 410 is a digital control signal to disable or enable the oscillator 420 and the phase clock generator 430. Unlike the analog bias signal 412 which needs time to propagate adjustments through the oscillator circuitry, this digital frequency blocking signal 414 can immediately operate the oscillator 420 and clock generator 430. The frequency blocking signal 414 goes directly to the last stage buffer of the logic blocks and disables the outputs there. The clocking and the pumping action terminates quickly because the last stage buffer is disabled before the effect of the bias signal 412 could work through the clocking logic circuits. For this embodiment, the frequency blocking signal 414 can override the bias signal 412. The oscillator output 422 is coupled to a phase clock generator 430. For this embodiment, the clock generator 430 provides four different clock signals CLK1 432, CLK2 434, CLK3 436, CLK4 438, with various phases. In other embodiments of charge pumps, the phase clock generator 430 can have more or less number of clock phases and output various other types of clock signals. The phase clock generator 430 drives the pumping action of the pump cells 440 with clock signals 432, 434, 436, 438.

The phased clock signals 432, 434, 436, 438, are coupled to the pump cells 440. As the clock signals 432, 434, 436, 438, transition, the pump cells 440 of the charge pump operate to provide a pumped voltage 442. The pumped output voltage 442 from the pump cells 440 first passes through a large diode device 450. For this embodiment of a high precision pump regulation mechanism, the diode 450 is constructed with an S type field effect transistor. Alternatively, an S' device can be used in the diode 450. S devices are also known as low threshold voltage (Vt) N type field effect transistors. Similarly, S' devices are also low Vt N type field transistors, but S' devices have a threshold voltage lower than that of a S type device. Although S and S' type field effect transistors are described in the present embodiment of the invention, N type and/or N' type transistors may also be used in alternative embodiments.

Diode 450 here is a very low Vt diode device. The large diode 450 of this embodiment has a size of approximately 2000 square microns, but is not limited as such. This diode can be considered huge relative to typical transistor sized diodes placed in integrated circuits. For alternative embodiments, the diode 450 can have a size anywhere on the order of approximately 2000 square microns or greater. The low Vt and low pass diode device 450 filters out high frequency spikes and ripples in the pump cell output 442. For this embodiment, the voltage drop across the diode filter 450 due to current loading is absorbed by the charge pump 400 itself and is invisible to external circuits. In addition, each pump cell itself comprises a small diode device internally for the protection of the pump cell from back conductance in certain embodiments. This internal diode is not present in other embodiments. During pumping operation of the pump cells 440, voltage levels between the pump stages are switched back and forth. At differently levels of the voltage changes, serious back conductance can occur.

The diode 450 shuts off automatically and stops supplying current from the pump cells 440 if the voltage level at its output starts to move above the level at its input terminal. If the diode 450 did not shut off, the pump cells 440 would continued to supply current until the feedback reached and notified the comparator 410 to shut down pump operations, which could be too late as the pump output has already overshot at that point in time. The diode 450 gates current from passing back to the pump cells 440. Thus the diode 450 can automatically shut down the power supply without waiting for the feedback response. The feedback response will occur, but at a later time. The output of the diode 450 is $V_{OUT}$ 452, also the charge pump output in this embodiment. $V_{OUT}$ 452 is the pumped supply voltage that can be used on various parts of the chip during algorithms.

$V_{OUT}$ 452 is also coupled to a resistor divider comprised of resistors R1 460 and R2 470. The resistor divider divides down $V_{OUT}$ 452 for the feedback loop. The pump feedback voltage 462 is taken between R1 460 and R2 470 of the resistor divider for comparison against the reference voltage 402 at the comparator 410. Thus the feedback loop of this embodiment extends from the comparator 410, through the oscillator 420, phase clock generator 430, pump cells 440, diode 450, R1 460, and back to the comparator 410. The pump voltage feedback 462 of this embodiment is sampled after the diode filter 450 instead of at the pump cell output 442 in order to reject unwanted pump overshoot and undershoot at the $V_{OUT}$ 452. The diode 450 also provides some feedback delay in the feedback loop. If the rippling of the pump output node has a high frequency, the lagging of diode can help to remove the rippling effect as VOUT 452 exceeds the pump cell output 442.

During operation, the comparator 410 enables the oscillator 420 with a bias signal 412. The phase clock generator 430 clocks the pump cells 440 of the charge pump based on an oscillator clock signal 422. The pump cells output a pumped voltage that is passed through a diode 450 to become a pumped supply voltage $V_{OUT}$ 452. $V_{OUT}$ 452 is sampled for the pump feedback voltage 462 between R1 460 and R2 470. The comparator 410 compares reference voltage 402 and the sampled pump feedback voltage 462 to determine whether $V_{OUT}$ 452, and essentially the charge pump operation, needs to be modified. In response to the comparison, the comparator 410 can alter the charge pump performance. If the comparator 410 determines that the pump feedback voltage 462 is low relative to the reference voltage 402, the pump cells 440 need to be enabled to provide a higher pumped voltage 442. Thus the comparator can increase the bias voltage 412 to the oscillator, which then responds with a higher frequency clock signal 422 to the phase clock generator 430. The higher frequency clock signal to the phase clock generator 430 will cause faster clock signals 432, 434, 436, 438, to increase the pumping operation of the pump cells, eventually increasing the pump output $V_{OUT}$ 452.

Alternatively, if the comparator 410 determines that the pump feedback voltage 462 is high relative to the reference voltage 402, the pump cells 440 need to be slowed to provide a lower pumped voltage 442. Thus the comparator can decrease the bias voltage 412 to the oscillator, which then responds with a lower frequency clock signal 422 to the phase clock generator 430. The lower frequency clock signal to the phase clock generator 430 will cause slower clock signals 432, 434, 436, 438, to decrease the pumping operation of the pump cells, eventually decreasing the pump output $V_{OUT}$ 452. But if the comparator 410 determines that $V_{OUT}$ 452 is extremely high and needs to be brought down quickly, the comparator can decrease pump output voltage 452 more quickly than biasing the oscillator 420 with a lower bias voltage 412. The pump regulation mechanism of this embodiment can perform frequency blocking and control on all four phases from the clock drivers of the phase clock generator 430 for rapid pump shutdown to reduce pump overshooting.

The comparator 410 can use its frequency blocking signal 414 to turn off or disable operation of the oscillator 420 and the phase clock generator 430. The last stage buffers of the clock driver 430 are disabled by the frequency blocking signal to stop outputting phased clock signals. By deactivating the oscillator 420 and the phase clock generator 430, the phased clock signals 432, 434, 436, 438, stop toggling and the pump cells 440 cease pumping operation. The voltage level of $V_{OUT}$ 452 lowers as the charge at $V_{OUT}$ 452 dissipates. When comparator 410 senses from the pump feedback 462 that $V_{OUT}$ 452 has decreased sufficiently, the frequency blocking signal 414 turns back on and enables operation of the oscillator 420 and the phase clock generator 430. The charge pump 400 resumes normal operation and provides a pumped supply voltage again at $V_{OUT}$ 452.

Thus embodiments of the present invention can provide a solution for high precision wordline control for read and verify operations with MLC flash devices where large voltage variations cannot be tolerated. A charge pump regulation mechanism in accordance with the present invention enables the direct control of the charge pump output through a feedback back loop of the output voltage. For one embodiment of the pump regulation in accordance with the present invention, the total pump output voltage variation can be limited to 100 mV peak to peak or ±50 mV across varying process corners and conditions. Voltage variations at the pump output 452 are propagated back to the clocking circuits that drive the pump. The pump output in essence helps to signal whether the operation of the pump cells need to be increased, decreased, or even temporarily ceased. Without the sampling of the pump output voltage and the feeding back of that information to the pump cell control, the charge pump logic would not be able to determine whether the output voltage is at the desired voltage level or within the tolerance range. This more accurate control of the pump output voltage level is needed in the operation of MLC flash devices to ensure proper data. Embodiments of this invention can also assist in the operation of single bit flash devices to better control voltage variations.

Embodiments of the present invention can provide more precise regulation at minimal costs. The additional circuitry for the comparator 410, diode 450, and feedback loop use small amounts of space relative to the total area of the die. And yet, power savings occurs during standby and algorithm execution. The pump regulation mechanism of this embodiment does not impact pump performance in terms of speed or efficiency.

For an alternative embodiment, the comparator 410 can have multiple frequency blocking signals to separately disable/enable the oscillator 420 and the phase clock generator 430. Thus the comparator 410 of this alternative embodiment can disable or enable the oscillator 420 or the phase clock generator 430 at different points in time. However, if the oscillator 420 alone is turned off in an attempt to decrease or stop the pumping activity of the pump cells 440, a lower $V_{OUT}$ 452 can take a longer amount of time in order to be achieved. This is because the phase clock generator 430 does not immediately responded to the shutting off of the oscillator 420 and time is required to propagate the clock signals 422 prior to disabling of the oscillator 420. On the other hand, disabling the phase clock generator 430 alone without disabling the oscillator can also stop the pumping action at the pump cells 440. However, because the oscillator 420 continues to provide a clock signal 422, the phase clock generator 430 can become confused or restart in an awkward or unknown state later.

FIGS. 5A–D are flow diagrams illustrating one embodiment of a method for high precision regulation of a charge pump. At block 502 of FIG. 5A, a pumped voltage is generated. This pumped voltage is filtered through a low voltage drop diode device at block 504 to become a pumped supply voltage at the output of a charge pump. The pump output voltage is divided at block 506 to obtain a feedback voltage. At block 508, the divided pump voltage is fed back through a feedback loop to pump control logic, a comparator in this embodiment. A reference voltage is also received at the pump control logic at 510. This reference voltage serves as a target voltage level at which the charge pump should presently be generating.

Figure 5A:
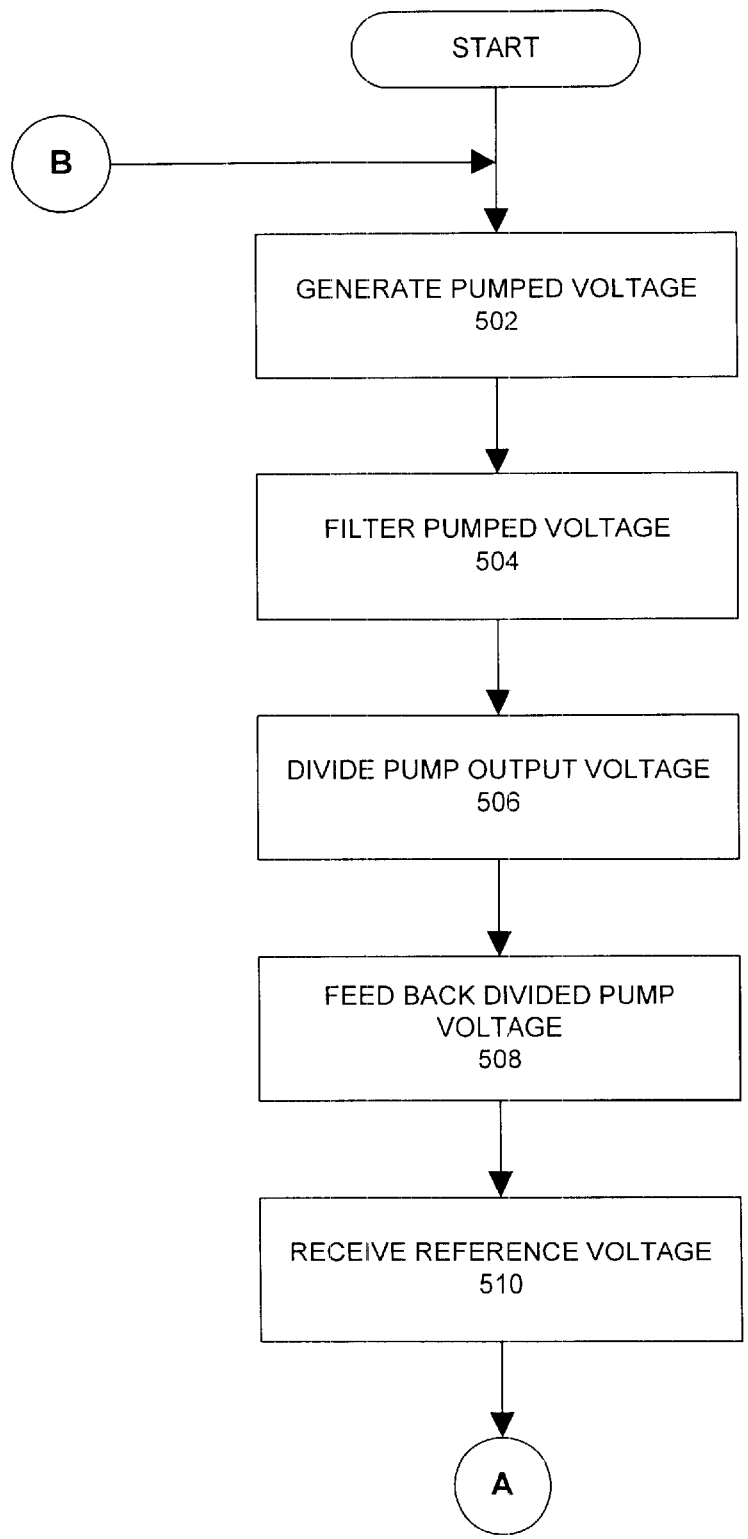
FIGS. 5A–D are flow diagrams illustrating one embodiment of a method for high precision regulation of a charge pump.
Figure 5B:
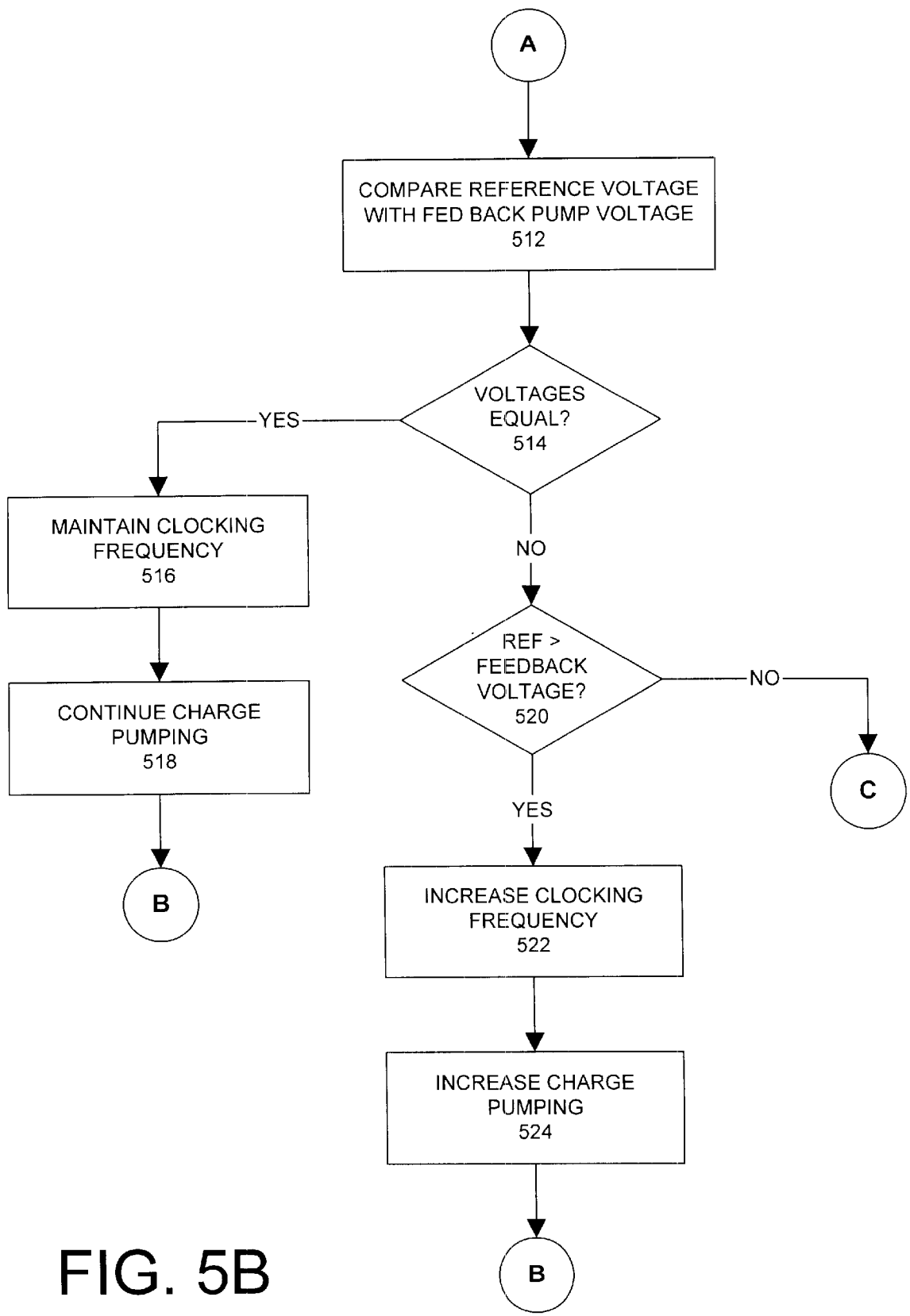
Figure 5C:
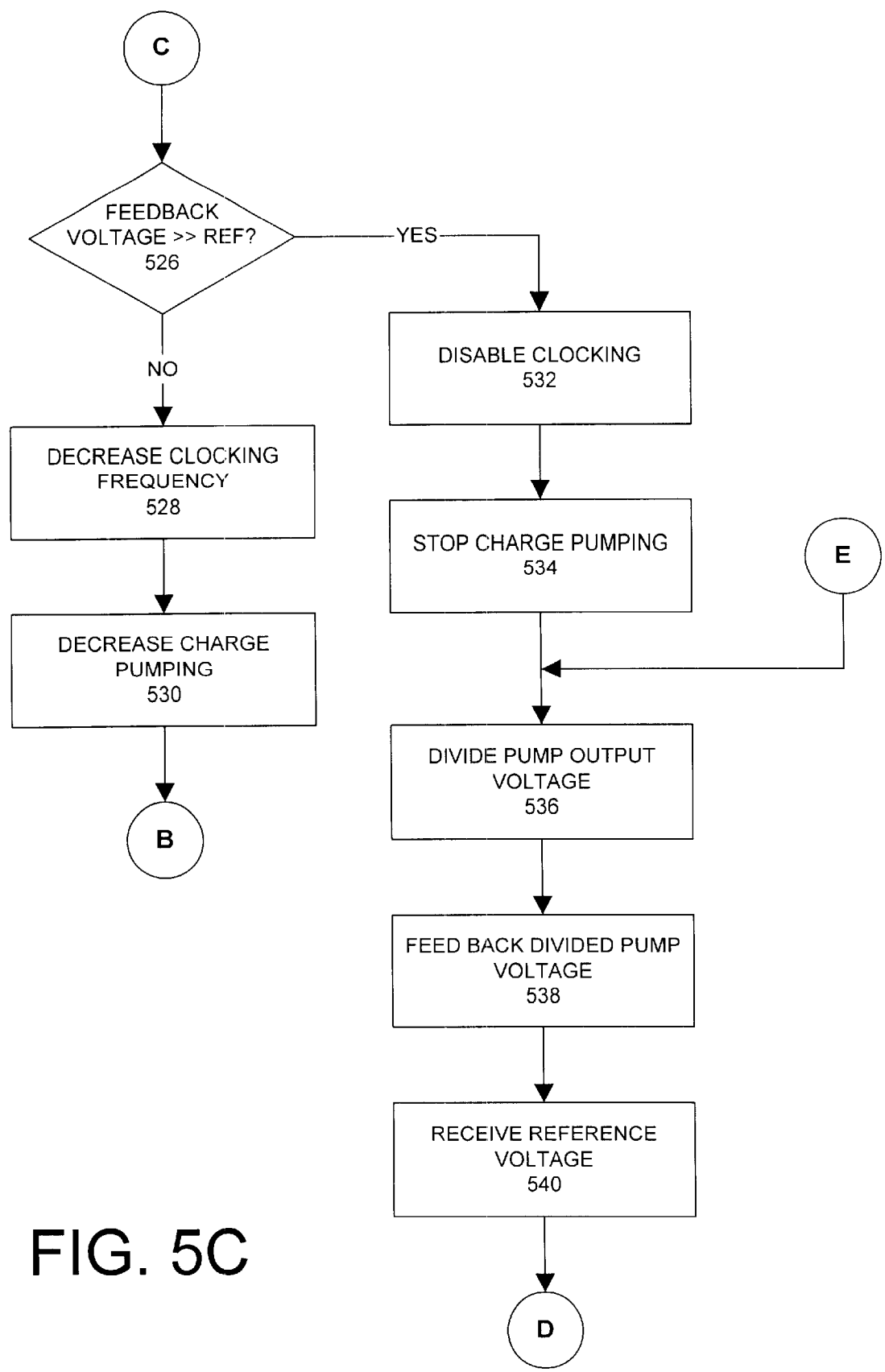

At block 512 of FIG. 5B, the reference voltage is compared with the fed back pump voltage at the comparator. The comparator determines whether the voltage levels are equal at block 514. If the voltages are equal, then the comparator maintains the present clocking frequency of the oscillator to the pump cells. The pump cells continue pumping at block 518. The pump cells proceed to generate a pumped voltage at block 502 as the cycle repeats.

But if the voltages are not equal at block 514, the voltages are also checked whether the reference voltage is greater than the pump feedback voltage at block 520. If the reference is greater than the feedback voltage, that condition indicates that the charge pump is not pumping enough and providing less than the presently desired voltage. In response, the pump control logic increases the clocking frequency of the oscillator to the pump cells at block 522. The charge pump cells increase the charge pumping operations due to the faster clock pulses at 524 to raise the voltage level at the pump output. The pump cells proceed to generate a pumped voltage at block 502 as the cycle repeats.

Now if the reference voltage is less than the pump feedback voltage at block 520, that condition indicates that either the charge pump has over pumped and providing more than the presently desired voltage or charge is being fed back to the charge pump output from circuits being supplied by the pump. At block 526 of FIG. 5C, the voltages are also checked whether the feedback voltage is much greater than the reference voltage. If the feedback voltage is not much greater than the reference voltage, the issue may be correctable with adjustments to the clocking. The comparator decreases the clocking frequency of the oscillator to the pump cells at block 528. The charge pump cells decrease pumping operations due to the slower clock pulses at block 530 to lower the voltage level at the pump output. The pump cells proceed to generate a pumped voltage at block 502 as the cycle repeats.

If the feedback voltage is determined to be much greater than the referenced voltage at block 526, the clocking to the pump cells is disabled at block 532. For one embodiment, the disable action entails disabling an oscillator and a phase clock generator. For another embodiment, the disable action involves the disabling of a last stage buffer at the clock output prior to the pump cells. At block 534, charge pump stops. Because charge pumping has ceased, charge is not being actively supplied from the charge pump. The output voltage from the charge pump should decrease in response as charge is being consumed by circuitry coupled to the pump output. The pump output voltage is divided at block 536 and fed back for sampling at block 538. The comparator received the pump feedback voltage and also the reference voltage at block 540.

Figure 5D:
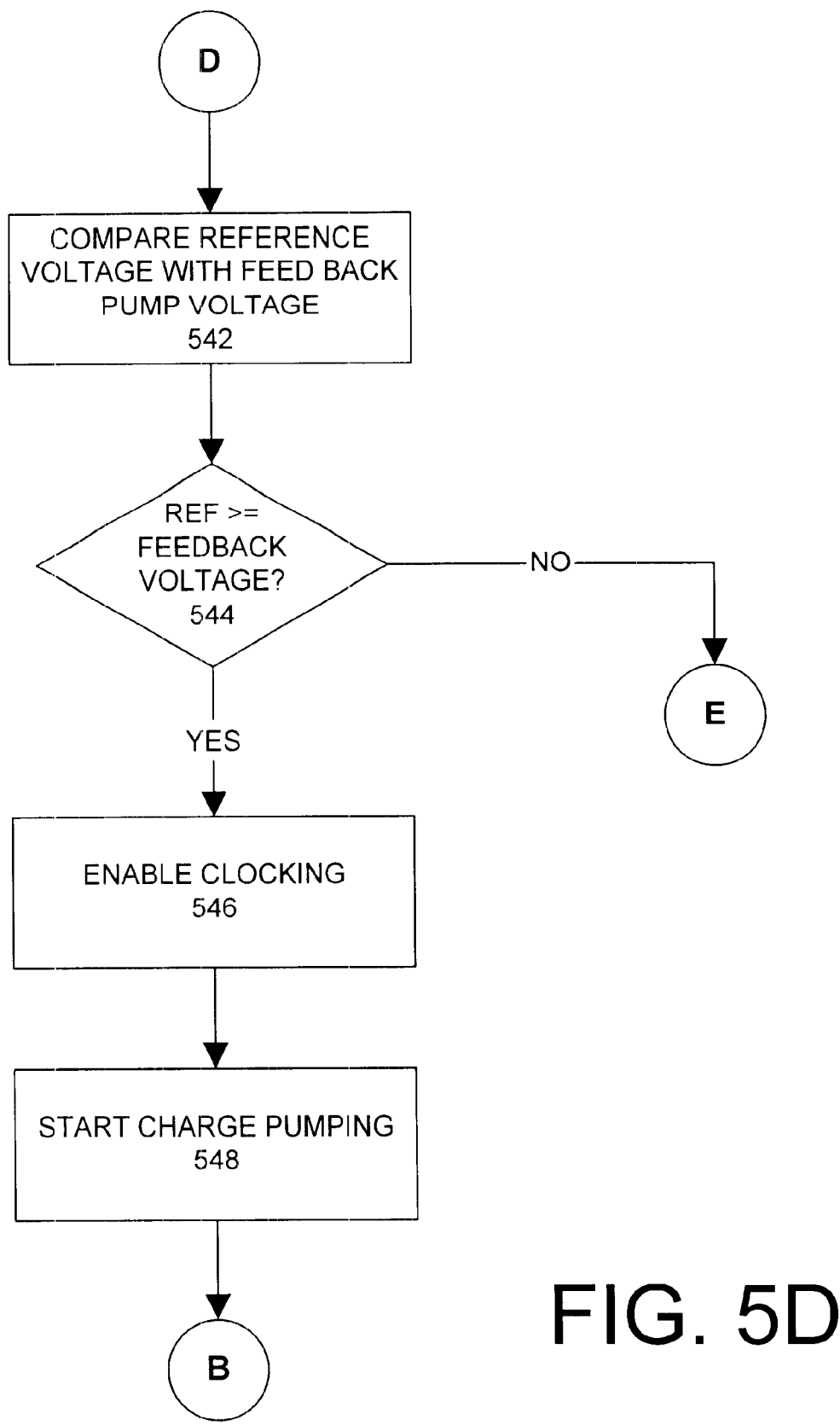

At block 542 of FIG. 5D, a comparison of the reference voltage and the pump feedback voltage is made. If the reference voltage is greater than or equal to the feedback voltage at block 544, that indicates that the pump output voltage has decreased sufficiently. Thus the charge pumping can resume. The clocking to the pump cells is enabled at block 546. For one embodiment, this involves enabling the last stage buffer of the clock generator in order to allow the clock phases to reach the pump cells. For another embodiment, the enabling action entails restarting an oscillator and/or a phase clock generator. The charge pumping resumes at block 548 and the pump cells proceed to generate a pumped voltage at block 502 as the cycle repeats.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
    comparing an output feedback voltage with a reference voltage to determine whether said output feedback voltage is greater than or less than said reference voltage during normal operation;
    responding to said comparison during said normal operation by either:
        increasing a frequency for a clock signal if said output feedback voltage is less than said reference voltage;
        decreasing said frequency for said clock signal if said output feedback voltage is greater than said reference voltage; or
        disabling said clock signal if said output feedback voltage is much greater than said reference voltage; and
    generating a pumped voltage in response to changes to said clock signal.

2. The method of claim 1 further comprising pumping charge from a supply voltage to generate a pumped output voltage, said pumped output voltage having a higher voltage level than said supply voltage.

3. The method of claim 2 further comprising filtering said pumped output voltage to remove noise from said pump output voltage.

4. The method of claim 3 further comprising dividing down said pump output voltage to obtain said output feedback voltage.

5. The method of claim 4 further comprising enabling said clock signal if said clock signal has been disabled and said output feedback voltage is presently less than or equal to said reference voltage.

6. The method of claim 5 wherein said clock signal comprises a four phase clocking scheme.

7. The method of claim 6 wherein a bias signal controls said clock signal, said bias signal to increase or decrease said frequency of said clock signal in response to said comparison of said output feedback voltage and said reference voltage.

8. A method comprising:
    receiving a reference voltage;
    receiving a feedback voltage, said feedback voltage provided from a charge pump output;
    comparing said reference voltage and said feedback voltage during normal operation;
    adjusting operation of charge pumping in response to said comparison; and
    generating a pumped voltage from said charge pumping.

9. The method of claim 8 further comprising outputting said pumped voltage at said charge pump output.

10. The method of claim 9 further comprising filtering said pumped voltage through a low threshold voltage (Vt) diode device.

11. The method of claim 10 wherein said diode device is to protect a charge pump by preventing charge from flowing from said charge pump output back into said charge pump.

12. The method of claim 11 wherein said operation adjusting further comprises frequency blocking of clocking to pump cells in said charge pump.

13. The method of claim 12 wherein said operation adjusting further comprises biasing a clock generator to alter a clock frequency of a clock signal generated from said clock generator, said clock signal to control pumping action of said pump cells.

14. The method of claim 13 wherein said biasing further comprises decreasing said clock frequency to slow down pumping action of said pump cells in order to generate a lower pumped voltage at said charge pump output.

15. The method of claim 14 wherein said biasing further comprises increasing said clock frequency to speed up pumping action of said pump cells in order to generate a high pumped voltage at said charge pump output.

16. The method of claim 15 further comprising feeding a form of said pumped voltage from said charge pump output back as a feedback voltage for comparison with said reference voltage.

17. An apparatus comprising:
    a comparator to receive and compare a reference voltage and a feedback voltage, said comparator to provide a first signal and a second signal;
    a clock system coupled to said comparator, said clock system to generate clock signals in response to said first and second signals;
    a pump cell coupled to said clock system, said pump cell to pump charge from a supply voltage to generate a pumped voltage greater than said supply voltage, wherein operation of said pump cell is controlled with said clock signals;
    a diode device coupled to said pump cell to filter said pumped voltage, said diode device to pass charge from an output of said pump cell to a charge pump output node; and
    a feedback mechanism to couple a charge pump output voltage from said charge pump output node to said comparator.

18. The apparatus of claim 17 wherein said first and second signals are generated by said comparator in response to a comparison of said reference voltage and said feedback voltage.

19. The apparatus of claim 18 wherein said first signal is an analog signal, said first signal to bias said clock system to either increase or decrease frequency of said clock signals.

20. The apparatus of claim 19 wherein said second signal is a digital signal, said second signal to frequency block said clock system to enable or disable output of said clock signals to said pump cell.

21. The apparatus of claim 20 wherein said clock system further comprises:
- an oscillator coupled to said first signal and said second signal, said oscillator to generate a oscillating clock signal in response to said first signal; and
- a phase clock generator coupled to said oscillator and said second signal, said phase clock generator to receive said oscillating clock signal and to generate a set of four phase clock signals based on frequency of said oscillating clock signal.

22. The apparatus of claim 21 wherein said first signal is to control said frequency of said oscillating clock signal.

23. The apparatus of claim 22 wherein said second signal is to disable operation of said oscillator and said phase clock generator if said feedback voltage is much greater than said reference voltage.

24. The apparatus of claim 23 wherein said diode device is a low threshold voltage (Vt), low pass diode.

25. The apparatus of claim 24 further comprising a voltage divider coupled to said charge pump output node and said feedback mechanism, said voltage divider to divide said charge pump output voltage down to said feedback voltage.

26. An integrated circuit comprising:
- a memory array to store data and instructions;
- decoding logic coupled to said memory array, said decoding logic to decode addresses to access memory cells within said memory array; and
- a charge pump coupled to said decoding logic, said charge pump to provide a high voltage supply for memory accesses, said charge pump further comprising:
    - a comparator to receive and compare a reference voltage and a feedback voltage, said comparator to provide a first signal and a second signal;
    - a clock system coupled to said comparator, said clock system to generate clock signals in response to said first and second signals;
    - a pump cell coupled to said clock system, said pump cell to pump charge from a supply voltage to generate a pumped voltage greater than said supply voltage, wherein operation of said pump cell is controlled with said clock signals;
    - a diode device coupled to said pump cell to filter said pumped voltage, said diode device to pass charge from an output of said pump cell to a charge pump output node; and
    - a feedback mechanism to couple a charge pump output voltage from said charge pump output node to said comparator.

27. The integrated circuit of claim 26 wherein:
- said first and second signals are generated by said comparator in response to a comparison of said reference voltage and said feedback voltage;
- said first signal is an analog signal, said first signal to bias said clock system to either increase or decrease frequency of said clock signals; and
- said second signal is a digital signal, said second signal to frequency block said clock system to enable or disable output of said clock signals to said pump cell.

28. The integrated circuit of claim 27 wherein said clock system further comprises:
- an oscillator coupled to said first signal and said second signal, said oscillator to generate a oscillating clock signal in response to said first signal, said first signal is to control said frequency of said oscillating clock signal;
- a phase clock generator coupled to said oscillator and said second signal, said phase clock generator to receive said oscillating clock signal and to generate a set of four phase clock signals based on frequency of said oscillating clock signal; and
- wherein said second signal is to disable operation of said oscillator and said phase clock generator if said feedback voltage is much greater than said reference voltage.

29. The integrated circuit of claim 28 further comprising a voltage divider coupled to said charge pump output node and said feedback mechanism, said voltage divider to divide said charge pump output voltage down to said feedback voltage.

* * * * *